United States Patent [19]
MacIndoe

[11] Patent Number: 5,848,479
[45] Date of Patent: Dec. 15, 1998

[54] BORE GAUGE CENTRALIZER

[75] Inventor: William MacIndoe, Exeter, R.I.

[73] Assignee: Federal Products Co., Providence, R.I.

[21] Appl. No.: 878,036

[22] Filed: Jun. 18, 1997

[51] Int. Cl.[6] .................................................... G01B 5/12
[52] U.S. Cl. ................................................. 33/542; 33/520
[58] Field of Search ............................... 33/501.04, 520, 33/533, 542, 542.1, 543, 544.4, 550, 551, 555, 555.3, 556, 558, 559, 644, 645

[56] References Cited

U.S. PATENT DOCUMENTS

| | | | |
|---|---|---|---|
| 2,253,803 | 8/1941 | Newberry | 33/501.4 |
| 2,601,496 | 6/1952 | Boat | 33/544.5 |
| 2,621,416 | 12/1952 | Brenneke | 33/551 |
| 3,178,828 | 4/1965 | Eisele | 33/559 |
| 4,169,317 | 10/1979 | Boné | 33/501.04 |
| 4,419,830 | 12/1983 | Miller | 33/542 |
| 5,379,522 | 1/1995 | Jacobs | 33/542.1 |
| 5,548,901 | 8/1996 | Isler | 33/542 |
| 5,640,778 | 6/1997 | Shiue et al. | 33/550 |

FOREIGN PATENT DOCUMENTS 2813842  10/1978  Germany .................................... 33/543

Primary Examiner—G. Bradley Bennett
Attorney, Agent, or Firm—Morse & Altman

[57] ABSTRACT

A bore gauge centralizer comprising a frame having a pair of parallel legs connected by a cross piece. One end of the frame is pivotally mounted to the gauge head so that the legs are generally parallel to the longitudinal axis of the gauge and the ends of the legs pivot in unison away from the head. A spring biases the leg ends away from the head. A roller is rotatably attached to the each leg end. The roller is a truncated solid oval so that a single contact point is made with the bore wall regardless of the position of the frame.

15 Claims, 5 Drawing Sheets

BORE GAUGE CENTRALIZER

BACKGROUND OF THE INVENTION

1. Field of the Invention

The present invention relates to bore gauges, more specifically, to bore gauge centralizers, the component of the bore gauge that ensures that the instrument is measuring the diameter of a bore.

2. The Prior Art

A bore gauge is an instrument designed to measure the inside diameter of a cylindrical bore. By way of example, a machinist drilling or cutting a bore in a workpiece will normally perform frequent precise measurements of the diameter of the bore to ensure that the finished diameter corresponds with specifications. While calipers can be used for this purpose, bore gauges are more convenient and quicker to use. A typical bore gauge has an elongated body with a head at one end and a measurement display at the other end. The head includes a centerline that is perpendicular to the longitudinal axis of the instrument. At one end of the centerline is a stem with a reference contact and at the opposite end is a sensing contact. The head includes a pair of centralizing contacts, one on either side of the sensing contact. The centralizing contacts and the reference contact serve to position the head so that the centerline is located precisely along the diameter of the bore. In that position, the sensing contact can make a measurement precisely at the diameter of the bore. The sensing contact is operatively connected to the measurement display, which may be a dial indicator, an LVDT, or the like.

In a typical centralizer, the centralizing contacts are the outer tips of a pair of plungers. The plungers are rigidly connected together in a carriage so that they move in unison. The carriage is mounted to move pivotally, with the pivoting axis approximately perpendicular to the longitudinal axis of the instrument, causing the plungers to move into and out of the head approximately perpendicularly to the longitudinal axis of the instrument. The carriage is spring-biased outwardly to push the centralizing contacts toward the bore wall.

The centralizer operates by establishing a chord on the bore wall between the centralizing contacts. A chord is established when both centralizing contacts are in contact with the bore wall. Initially, when the bore gauge is inserted into the bore, only one centralizing contact is touching the bore wall. The bore gauge is manually rocked back and forth. The rocking motion allows the spring bias to operate to rotate the bore gauge along its longitudinal axis until both centralizing contacts touch the wall. The rotation is facilitated by the curve of the bore wall. If the friction between the bore wall and the plunger tips is too great, the tendency will be for the centralizing contacts to "stick" to the wall and not allow the bore gauge to rotate with enough resolution to find the exact diameter of the bore. This is aggravated with large diameter bores, because the bore wall approaches being flat relative to the size of the bore gauge. Consequently, there is a desire to reduce the friction between the centralizing contacts and the bore wall.

In the current state of the art, the centralizing contacts are polished smooth in order to reduce the friction. Some centralizer designs use plungers that are angled with respect to each other and symmetrical with respect to the centerline. The main disadvantage to this design is that it is mechanically complicated because of the need to have the plungers move in unison, resulting in greater manufacturing costs. And it is not a complete solution because the friction between the centralizing contacts and the bore wall remains.

SUMMARY OF THE INVENTION

An object of the present invention is to provide a bore gauge centralizer that has reduced friction between the centralizer contacts and the bore wall than centralizers of the prior art.

The centralizer of the present invention includes a rigid frame that has a pair of generally cylindrical, parallel legs and a cross piece for ensuring that the legs move in unison. The upper end of the legs are mounted to a boss on the gauge head that is above the sensing contact. The boss and legs are connected by an axle to form a pivoting hinge. The legs extend generally parallel to the longitudinal axis of the bore gauge. A spring provides the bias necessary to push the lower end of the frame away from the head during the centering process. The frame is prevented from being pushed too far from the head by a knob on the frame making contact with the end of a screw that extends downwardly through the boss.

The essential aspect of the present invention is the addition of a roller at the lower end of each leg. Rather than sliding across the bore wall, like the plungers of the prior art, the rollers of the present invention roll along the wall, reducing the amount of friction generated and allowing for a more accurate determination of the diameter of the bore.

The roller is a component of a roller cartridge, which also includes an axle to which the roller is attached. The roller cartridge is mounted so that the roller and axle rotate on an axis that is parallel to the longitudinal axis of the leg. The roller cartridge fits within a cylindrical opening that extends into the end of the leg. A pair of roller bearings on the axle separated by a sleeve fit in the opening to provide the axle the ability to rotate. Alternatively, the roller bearings are replaced by low-friction collars. The roller cartridge is removably secured within the leg by a screw extending through a hole in the leg and into a hole in the sleeve.

The roller is a truncated solid oval, preferably, a sphere. An ovoid shape is used so that the circumferential side of the roller is convex. If the side was straight, the edge of the side could cause damage to the bore wall when the frame pivots in the centering process. The roller has at least one flat end to which the axle is attached. The axle is aligned with the axis of the roller so that the roller rotates symmetrically about the axis of the axle.

The frame is positioned so that the rollers are located on either side of and equidistant from the sensing contact. Preferably, the rollers, sensing contact, and reference contact are approximately planar, where the plane is perpendicular to the longitudinal axis of the gauge. If this were not the case, the centralizer would not be centering the bore gauge at the same location within the bore as was being measured.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

Figure 1:
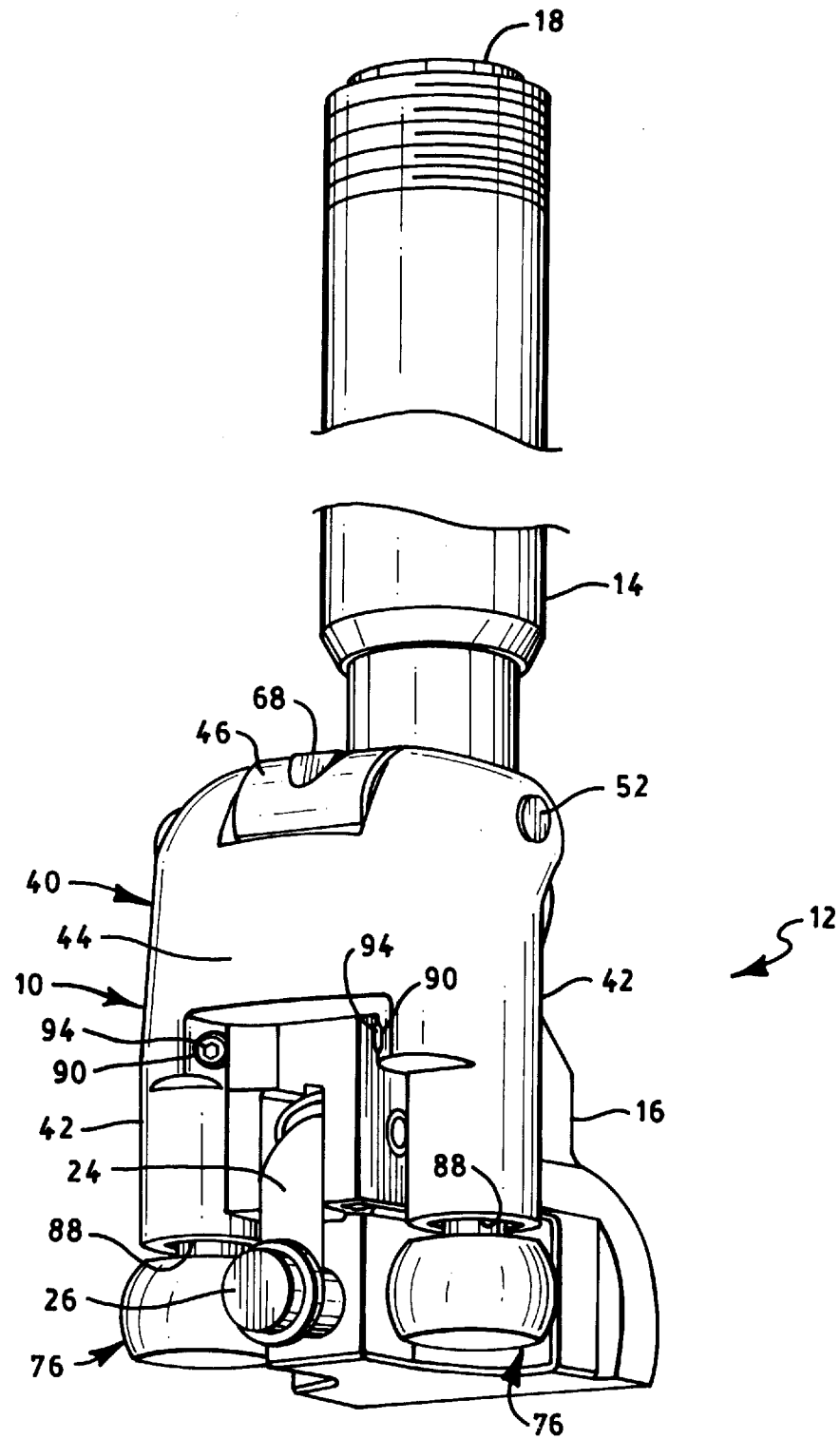
FIG. 1 shows a perspective of a typical bore gauge head incorporating the present invention.
Figure 2:
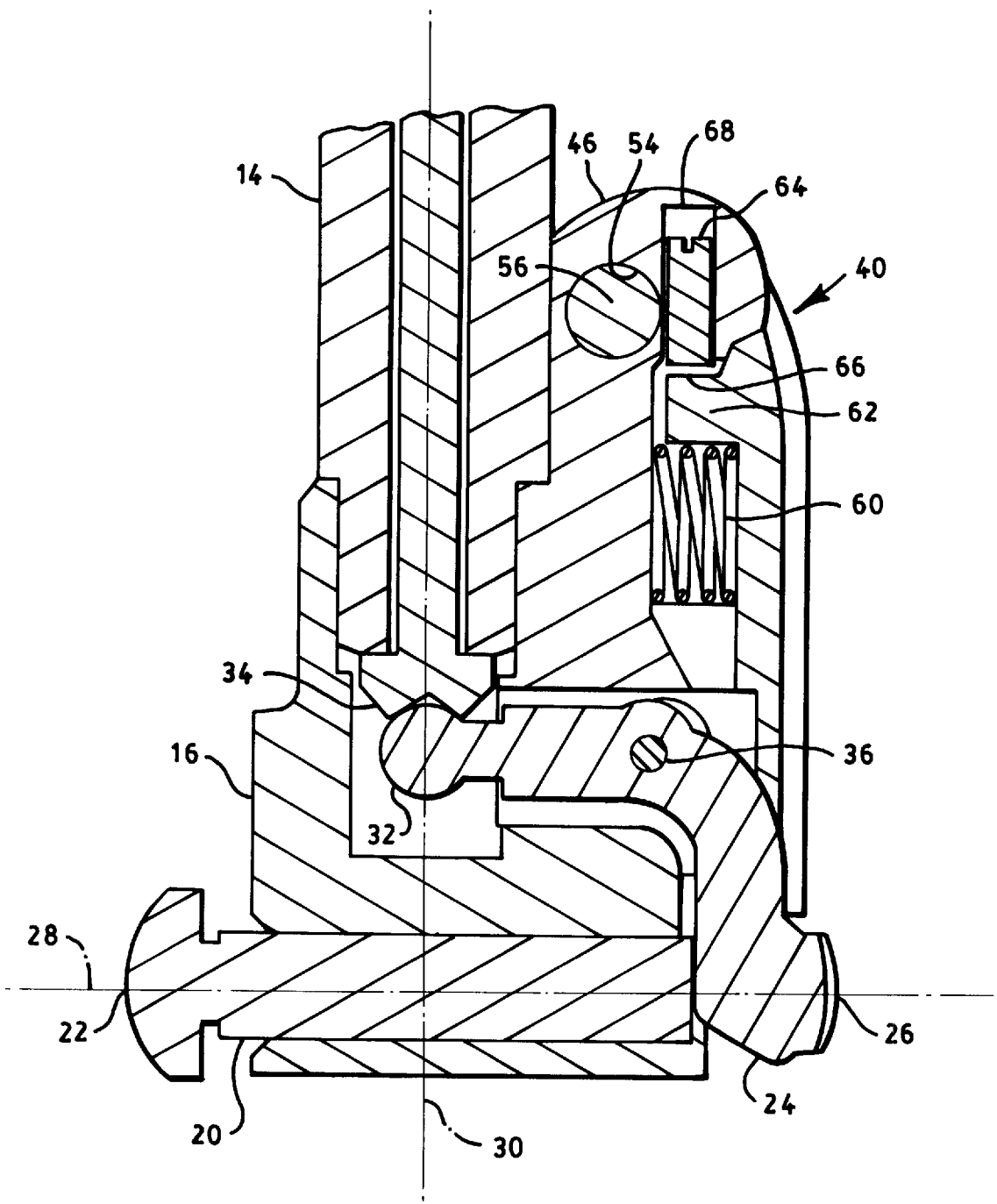
FIG. 2 shows a cross-section of the measurement mechanism of a typical bore gauge within a bore.

The bore gauge centralizer 10 of the present invention is for use as a component of a bore gauge 12, as shown in FIG. 1. The typical bore gauge 12 has an elongated body 14 with a head 16 at one end and a measurement display or a connection 18 for a measurement display at the other end. A cross-section of the measurement mechanism of a typical bore gauge 12 is shown in FIG. 2. On one side of the head is a stem 20 extending from the head 16 that has a reference contact 22 at its tip. The reference contact 22 touches the wall of the bore during measurement. The distance that the reference contact 22 extends from the head 16 is fixed during a measurement, but may be adjustable so that the bore gauge can be used to measure bores with different ranges of diameters. On the opposite side of the head 16 and at the end of a pivoting arm 24 is a sensing contact 26. The sensing contact 26 is aligned with the reference contact 22 on a centerline 28 that extends through and is perpendicular to the longitudinal axis 30 of the bore gauge 12.

When the bore gauge 12 is inserted into a bore, the fixed-position reference contact 22 and the pivoting measuring sensing contact 26 touch the bore wall. The length of the arc about the pivoting axis 36 through which the pivoting arm 24 moves depends upon the diameter of the bore. As the pivoting arm 24 pivots inwardly, the inner end 32 of the arm 24 pushes a transfer rod 34 longitudinally through the body 14. The linear distance traveled by the transfer rod 34 is translated by measurement display to a measurement of the diameter of the bore.

Figure 3:
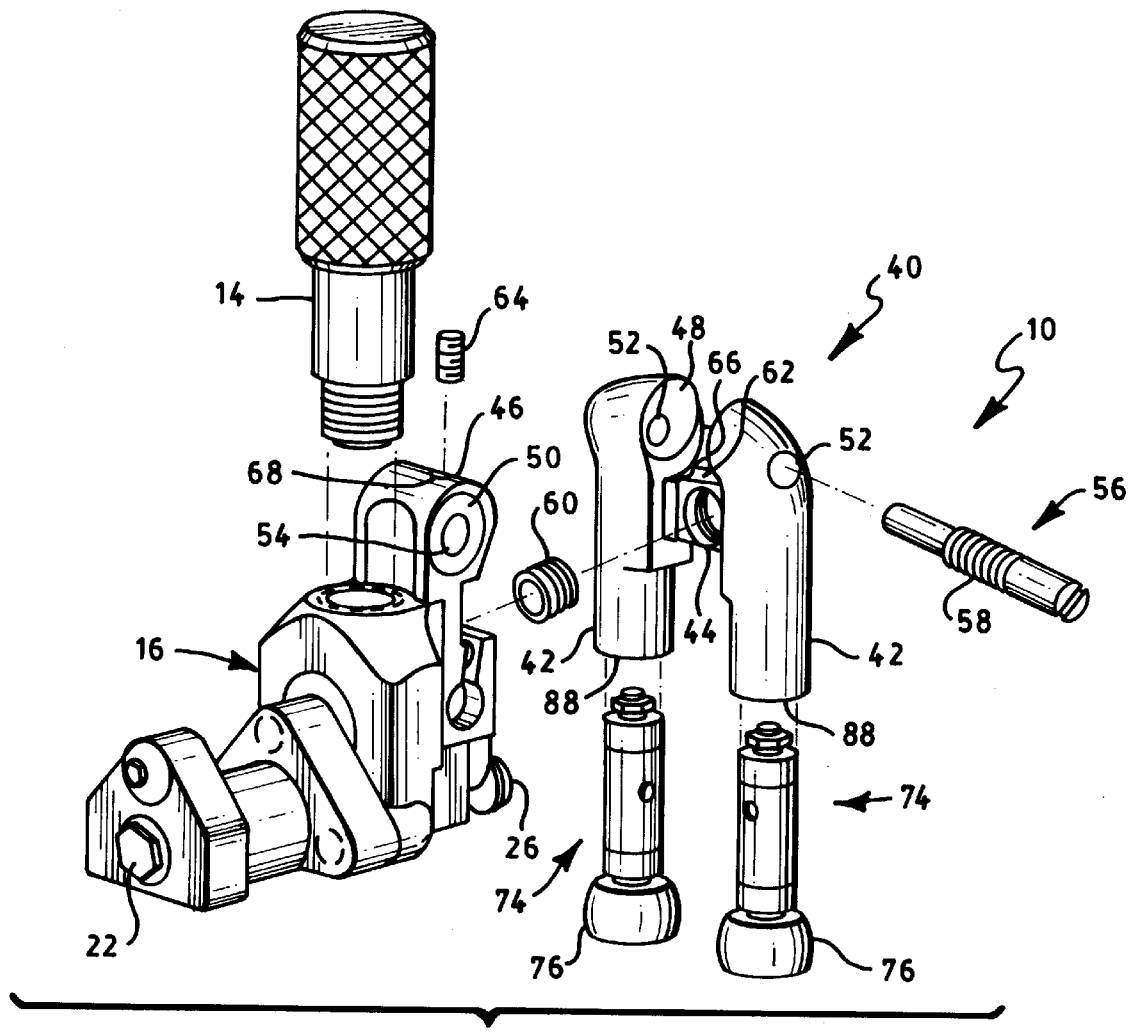
FIG. 3 shows a partially exploded view of the centralizer of the present invention.

A partially exploded view of one embodiment of the centralizer 10 of the present invention is shown in FIG. 3. The centralizer 10 includes a frame 40 that has a pair of parallel legs 42 and a cross piece 44. The purpose of the cross piece 44 is to make sure that the legs 42 move in unison, a necessary characteristic of the centralizer, as described above. Consequently, the cross piece 44 must be rigid. The cross piece 44 may connect the two legs 42 where convenient. In the illustrated embodiment, the legs 42 and cross piece 44 form roughly an H shape. Other possible locations for the cross piece 44 are at the lower ends of the legs 42 and at the upper ends of the legs 42.

The legs 42 are generally cylindrical in shape. The upper end of the legs 42 are mounted to the gauge head 16 in the form of a hinge. A boss 46 extends from the head 16 and the inner facing surfaces 48 at the upper end of the legs 42 straddle the ends 50 of the boss 46. Thus, the boss ends 50 and the inner facing surfaces 48 of the legs 42 are bearing surfaces. So, these surfaces 48, 50 are substantially flat and parallel so that they can move relative to each other with a low amount of friction when the frame 40 rotates. Radially through the end of each leg 42 and longitudinally through the boss 46 are three axially-aligned through holes 52, 54. The holes are perpendicular to the longitudinal axis 30 of the bore gauge 12. Extending through the holes 52, 54 is an axle 56 upon which the frame 40 rotates. Any method for securing the axle 56 that allows the frame 40 to rotate is contemplated by the present invention. The preferred way to secure the axle 56 is to provide mating threads on the center portion 58 of the axle 56 and in the boss hole 54. The bearing surfaces are the outer portions of the axle 56 and the legs holes 52.

A spring 60 provides the bias necessary to push the frame 40 away from the head 16 during the centering process. Contemplated forms for the spring include a helical spring 60 between the head 16 and cross piece 44, shown in FIG. 3, a U spring between the head 16 and cross piece 44, and a torsion spring mounted on the pivoting axle 56, where the helical spring is the preferred form. The spring 60 is strong enough to push the frame 40 away from head 16, but not so strong that it will cause the centralizer to damage the surface of the bore that is being measured.

The frame 40 is prevented from being pushed too far from the head by a knob 62 on the frame 40 making contact with the end of a screw 64. The upper surface 66 of the knob 62 is located just below and outwardly of the pivoting axis. The screw 64 extends downwardly through a threaded hole 68 in the boss 46. As the frame 40 pivots outwardly, the knob upper surface 66 rotates upwardly. Eventually, the knob upper surface 66 makes contact with the lower end of the screw 64, preventing the frame 40 from further outward movement.

The frame 40 is composed of a rigid material. Preferred materials include cast metals, machined metals, and composites. The most preferred materials are 300-series stainless steels and 4140 alloy steel.

Figure 4:
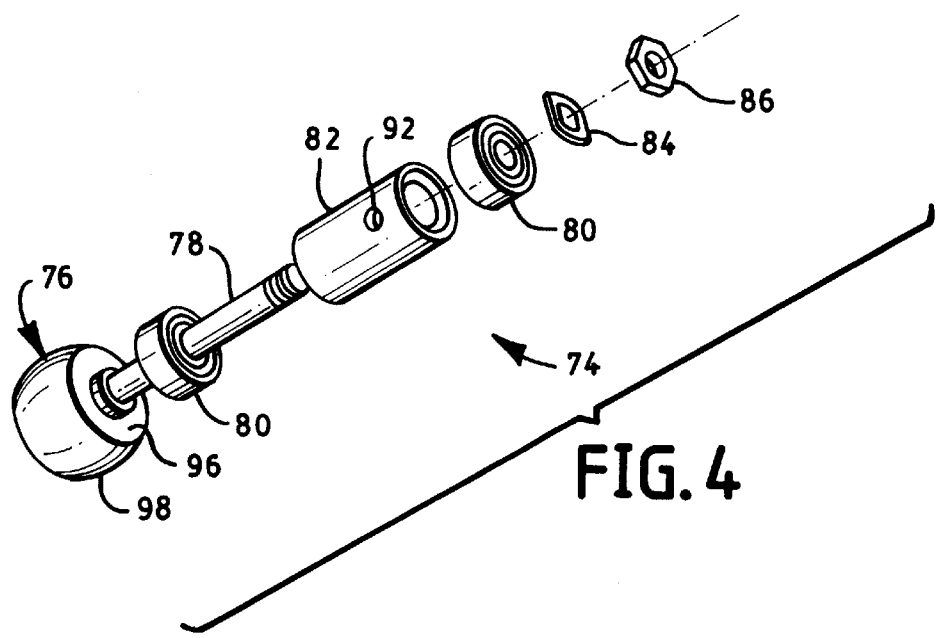
FIG. 4 shows an exploded view of a roller cartridge.

Mounted to the lower end of each leg 42 is a roller cartridge 74. As shown in FIG. 4, the roller cartridge 74 includes a roller 76 fixedly attached to the end of an axle 78. The roller cartridge 74 is mounted so that the roller 76 and axle 78 rotate on an axis that is parallel to the longitudinal axis of the leg 42. Along the length of the axle 78 is a pair of roller bearings 80 separated by a spacing sleeve 82. Alternatively, the roller bearings are replaced by collars that have an inner surface with a low coefficient of friction. The preferred material for these collars is TEFLON® or the equivalent. Roller bearings are preferred because they wear better than the collars. The end of the axle 78 is threaded to accept a washer 84 and nut 86, which secure the bearings 80 and sleeve 82 to the axle 78. When roller bearings are used, the washer 84 is an undulant spring that presses the roller bearings 80 and sleeve 82 tightly together. When collars are used, the washer 84 is a flat washer.

The roller cartridge 74 fits into a cylindrical opening 88 that extends into the lower end of the leg 42. The diameter of the opening 88 is the same as the outer diameter of the roller bearings 80 or the collars. The roller cartridge 74 is secured in the cylindrical opening 88 by a screw 94 extending through a hole 90 in the side of the leg 42 and into a hole 92 in the side of the sleeve 82. Preferably, the leg hole 90 is threaded and the end of the screw 94 comes to a point to simplify alignment of the holes 90, 92. Alternatively, the roller cartridge 74 is secured in the cylindrical opening 88 by a press-fit pin extending through a hole in the side wall of the leg 42 and into a hole in the side of the sleeve 82. The use of a screw 94 is preferred over the pin because it greatly simplifies replacement of the roller cartridge 74, should it become necessary due to wear or damage.

The roller 76 is a truncated convex surface of revolution as defined by an arc rotated about an axis. In other words, the roller 76 is a solid oval with at least one end removed. An ovoid shape is used so that the circumferential side 98 of the roller 76 is convex, not straight. If the side were straight, the edge of the roller, not the side, would be making contact with the bore wall 112 in all but one position of the frame 40. If this were the case, the edge of the roller 76 would most likely damage the bore wall 112. The preferred radius of curvature of the side 98 is obtained when the roller 76 is a sphere with one end removed. Because the side 98 of the roller 76 is convex, it makes contact with the bore wall 112 at a point 100, rather than along a line or surface. That point 100 is the contact point.

The ends 96 of the roller 76 are circular, although not necessarily flat. The axle 78 is attached to the roller 76 in the center of one of the ends 96. The axle 78 is attached so that its axis is aligned with the axis of the roller 76 in order that the roller 76 rotate symmetrically, rather than eccentrically, about the axis of the axle 78.

The roller 76 is composed of a wear-resistant material. Preferred materials include cast metals, machined metals, and composites. The most preferred materials are martensitic steels, most particularly AISI type 440C chromium stainless steel.

The frame 40 is positioned so that the rollers 76 are located on either side of the sensing contact 26. The contact points 100 of the two rollers are substantially the same distance from the sensing contact. In addition, the roller contact points 100, sensing contact 26, and reference contact 22 are approximately planar, where the plane is perpendicular to the longitudinal axis of the bore gauge 12. If this were not the case, the centralizer 10 would not be centering the bore gauge 12 at the same location within the bore 110 as was being measured.

Figure 5:
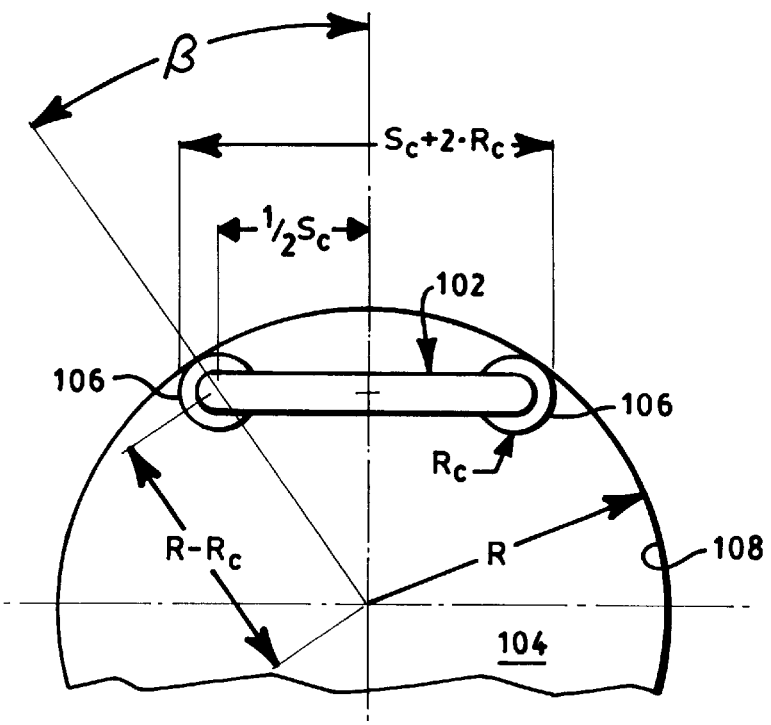
FIG. 5 shows a schematic of the top view of a centralizer that is centered in a bore.

The centralizer of the present invention will operate within a much greater range of bore diameters than centralizers of the prior art. FIG. 5 shows a centralizer 102 of the present invention centered in a bore 104. The minimum bore diameter that the centralizer can enter is given by $$D_{min} = S_c + 2R_c \tag{1}$$

where $S_c$ is the distance between the centers of the two rollers 106 and $R_c$ is the radius of a centralizer roller 106. In general, the contact angle between the centralizer and bore, b, can be found as $$b = \arcsin((S_c/2)/(R-R_c)) \tag{2}$$

where R is the radius of the bore.

Figure 6:
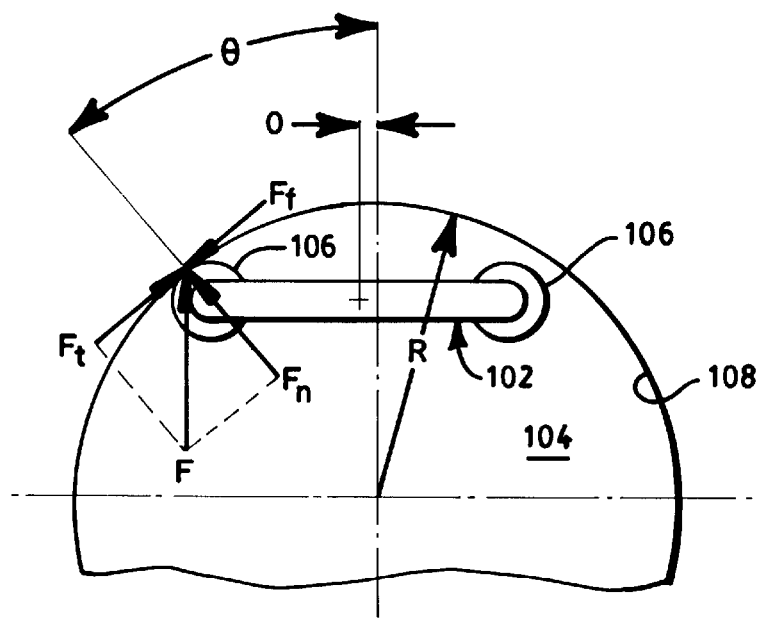
FIG. 6 shows a schematic of the top view of a centralizer that is not centered in a bore.

FIG. 6 shows the same centralizer in the same diameter bore 104 moved off center by an amount O. The centralizer force, F, the amount of force exerted by the spring to push the centralizer frame outwardly, can be resolved into two components, $F_n$, a force normal to the bore surface 108, and $F_t$, a force tangent to the bore surface 108. The tangential force, $F_t$, tends to push the centralizer assembly toward the centralized condition of FIG. 5. The friction force of the roller on the bore surface of the bore, $F_f$, tends to oppose the tangential force, $F_t$. As long as $F_t$ is greater than $F_f$, the centralizer 102 will be pushed toward the center until both rollers 106 touch the bore surface 108.

The angle of the non-centered centralizer, q, is found by $$q = \arcsin((S_c/2+O)/(R-R_c)) \tag{3}$$

The tangential force is found by $$F_t = F \times \sin(q) \tag{4}$$

and the friction force is found by $$F_f = F_n \times m = F \times \cos(q) \times m \tag{5}$$

where m is the coefficient of friction between the roller 106 and the bore surface 108. The effective limit of the centralizer is reached when the tangential force equals the friction force, or $$F_t = F_f \tag{6}$$

Substituting equations (4) and (5) into (6) results in $$F \times \sin(q) = F \times \cos(q) \times m \tag{7}$$

and solving for m yields $$m = \sin(q)/\cos(q) = \tan(q) \tag{8}$$

Substituting equation (3) for q and taking the arctangent of both sides results in $$\arctan(m) = \arcsin((S_c/2+O)/(R-R_c)) \tag{9}$$

and taking the sine of both sides is $$\sin(\arctan(m)) = (S_c/2+O)/(R-R_c) \tag{10}$$

Because the centralizer must operate as the offset, O, approaches zero, O can be set to 0, or $$\sin(\arctan(m)) = (S_c/2)/(R-R_c) \tag{11}$$

In equation (11), R is the maximum bore radius, $R_{max}$, within which the centralizer will properly operate. Solving equation (11) for $R_{max}$ yields $$R_{max} = ((S_c/2)/\sin(\arctan(m))) + R_c \tag{12}$$

or $$D_{max} = 2 \times ((S_c/2)/\sin(\arctan(m))) + R_c \tag{13}$$

which is the maximum diameter within which the centralizer of the present invention will operate.

This maximum diameter is significantly greater than the maximum diameter of centralizers of the prior art. Assume that the coefficient of friction between two steel surfaces, such as between a bore surface and a polished centralizer plunger tip, is 0.5, which is on the low end of the possible range, and that the coefficient of friction between the bore surface and the roller of the present invention is approximately 0.1. The sines of the arctangents of these values, as used in equation (13), are 0.45 and 0.1, respectively. Because these values are in the denominator in equation (13), they are inverted, resulting in a ratio of approximately 4.5:1, the ratio of the maximum bore diameter for the centralizer of the present invention to that of centralizers of the prior art, a significant difference.

OPERATION

Figure 7:
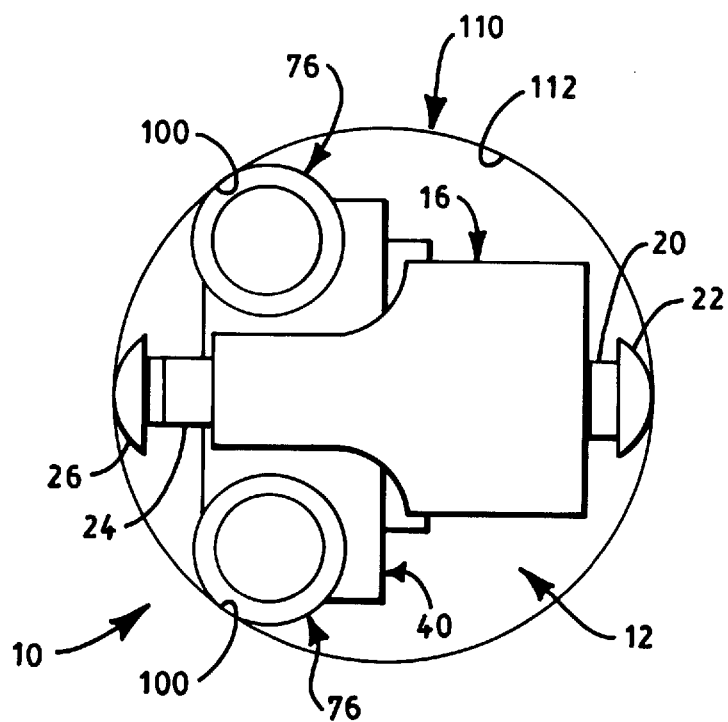
FIG. 7 shows a bottom view of the bore gauge in a bore while in use.

FIG. 7 shows the bore gauge 12 in a bore 110. Prior to use, the centralizer frame 40 is biased outwardly its full amount from the gauge head 16, which means that the head 16 will not fit directly into a bore 110. The gauge 12 is inserted into the bore 110 by tilting the gauge 12 and placing the centralizer rollers 76 against the bore wall 112, pushing the gauge 12 against the wall 112 where the rollers 76 are making contact, tilting the head 16 back so that it is aligned with the bore 110, and releasing the pushing pressure. When the head 16 is tilted back, the reference contact 22 moves into the bore 110 and when the pressure is released, moves into contact with the bore wall 112.

Initially, when the bore gauge 12 is inserted into the bore 110, only one roller 76 is touching the bore wall 112. The bore gauge 12 is manually rocked back and forth. The rocking motion allows the spring 60 to operate to rotate the bore gauge 12 against the curve of the bore wall 112. While the gauge 12 is being rocked, the roller 76 that is in initial contact with the bore wall 112 rotates about its axis as the gauge 12 rotates within the bore 110. When the other roller 76 contacts the bore wall 112, the diameter of the bore 110 is found. The user stops rocking the gauge 12 and reads the measurement.

Thus it has been shown and described a bore gauge centralizer which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A bore gauge centralizer for use as a component of a bore gauge including an elongated body with a longitudinal axis and a head at one end, said head including a sensing contact, said bore gauge centralizer comprising:
   (a) a rigid frame having a pair of parallel arms and a cross piece extending between said arms;
   (b) a first end of each of said arms being pivotally attached to said head on a common pivoting axis that is perpendicular to said longitudinal axis, said arms extending generally parallel to said longitudinal axis and along opposite sides of said sensing contact;
   (c) a roller rotatably attached to a second end of each of said arms such that the axis of rotation of said roller is generally parallel to said longitudinal axis; and
   (d) biasing means for biasing said second end of said arms away from said head.

2. The bore gauge centralizer of claim 1 wherein said roller has a circumferential side and at least one end, said side being convex.

3. The bore gauge centralizer of claim 1 wherein said roller is a truncated sphere.

4. The bore gauge centralizer of claim 1 wherein said centralizer includes a roller cartridge, said roller cartridge including said roller attached to one end of an axle, said axle being rotatably mounted within an opening extending into said second end of said leg.

5. The bore gauge centralizer of claim 4 wherein said roller cartridge is removable.

6. The bore gauge centralizer of claim 1 wherein said biasing means includes a spring.

7. The bore gauge centralizer of claim 6 wherein said spring is a helical spring between said head and said cross piece.

8. A bore gauge centralizer for use as a component of a bore gauge including an elongated body with a longitudinal axis and a head at one end, said head including a sensing contact, said bore gauge centralizer comprising:
   (a) a rigid frame having a pair of parallel arms and a cross piece extending between said arms;
   (b) a first end of each of said arms being pivotally attached to said head on a common pivoting axis that is perpendicular to said longitudinal axis, said arms extending generally parallel to said longitudinal axis and along opposite sides of said sensing contact;
   (c) a roller rotatably attached to a second end of each of said arms such that the axis of rotation of said roller is generally parallel to said longitudinal axis, said roller having a circumferential side and at least one end, said side being convex; and
   (d) a spring for biasing said second end of said arms away from said head.

9. The bore gauge centralizer of claim 8 wherein said roller is a truncated sphere.

10. The bore gauge centralizer of claim 8 wherein said centralizer includes a roller cartridge, said roller cartridge including said roller attached to one end of an axle, said axle being rotatably mounted within an opening extending into said second end of said leg.

11. The bore gauge centralizer of claim 10 wherein said roller cartridge is removable.

12. The bore gauge centralizer of claim 8 wherein said spring is a helical spring between said head and said cross piece.

13. A bore gauge centralizer for use as a component of a bore gauge including an elongated body with a longitudinal axis and a head at one end, said head including a sensing contact, said bore gauge centralizer comprising:
   (a) a rigid frame having a pair of parallel arms and a cross piece extending between said arms;
   (b) a first end of each of said arms being pivotally attached to said head on a common pivoting axis that is perpendicular to said longitudinal axis, said arms extending generally parallel to said longitudinal axis and along opposite sides of said sensing contact;
   (c) a roller cartridge including a roller attached to one end of an axle, said axle being rotatably mounted within an opening extending into said second end of said leg such that the axis of rotation of said roller is generally parallel to said longitudinal axis, said roller having a circumferential side and at least one end, said side being convex; and
   (d) a spring between said head and said cross piece for biasing said second end of said arms away from said head.

14. The bore gauge centralizer of claim 13 wherein said roller is a truncated sphere.

15. The bore gauge centralizer of claim 13 wherein said roller cartridge is removable.

* * * * *